July 3, 1951     H. SCHOTTLER     2,559,230

VARIABLE-SPEED FRICTIONAL GEARING

Filed Dec. 30, 1948     2 Sheets-Sheet 1

Inventor
Henry Schottler
By his attorneys
Howson and Howson

July 3, 1951 H. SCHOTTLER 2,559,230
VARIABLE-SPEED FRICTIONAL GEARING
Filed Dec. 30, 1948 2 Sheets-Sheet 2
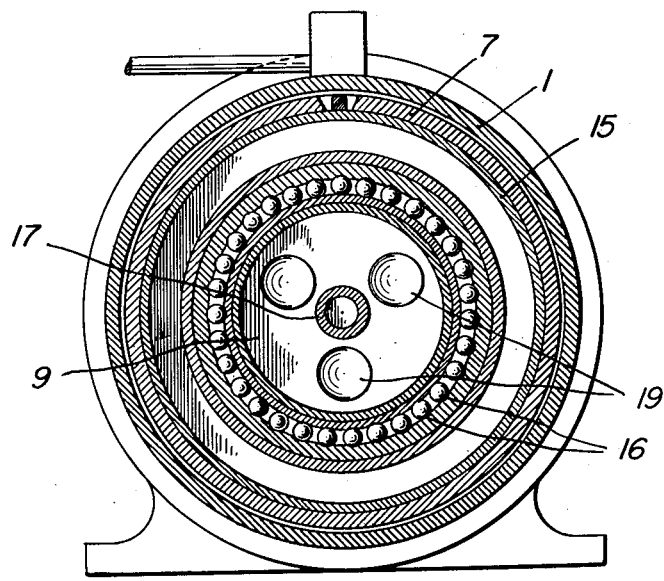
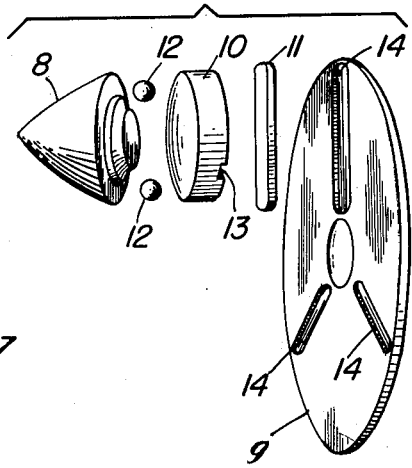
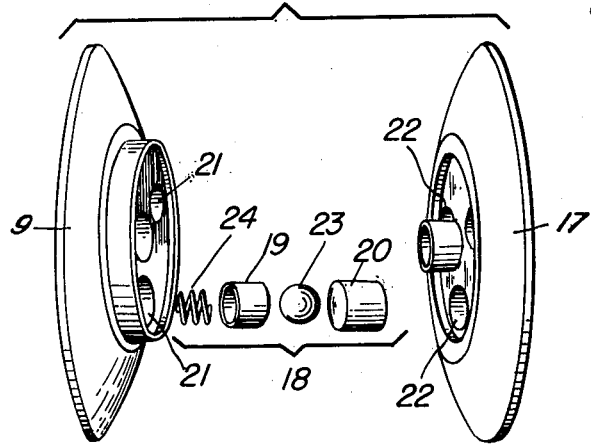
Inventor
Henry Schottler
By his attorneys
Howson and Howson Patented July 3, 1951

2,559,230

UNITED STATES PATENT OFFICE 2,559,230

VARIABLE-SPEED FRICTIONAL GEARING

Henry Schottler, New Orleans, La., assignor to Roller Gear Corporation, New York, N. Y., a corporation of New York Application December 30, 1948, Serial No. 68,185
In Switzerland April 12, 1948

17 Claims. (Cl. 74—796)

This invention pertains to frictional gearings and particularly to a frictional gearing which allows an infinite variety of speed ratios.

Frictional gearings having infinitely variable speed ratios have been known but hitherto these have necessarily carried high loads on large bearings and therefore have had relatively poor efficiency.

The present invention provides for a frictional gearing or drive means adjustable over a wide range of speeds and in which there are relatively small bearing stresses thus allowing small bearings to be used. It is characteristic of the present invention that power is transmitted by means of rollers moving between two conical surfaces and that the points of contact of the rollers lie in a plane which is always perpendicular to the axis of one of the conical surfaces.

It is an important feature of the present invention that the load on the power transmitting parts is proportional to the torque to be transmitted thus providing a high efficiency through all ranges of power.

In the drawings:

Fig. 3 is a vertical sectional view taken on the line 3—3 of Fig. 1 showing the relation of the discs and bearings in the preferred embodiment of my invention;

Fig. 4 is an exploded perspective view showing the relationship of the rollers and planetary holders in the preferred embodiment of my invention;

Fig. 5 is an exploded perspective view showing the relationship of the planetary holders and the frictional discs in the preferred embodiment of my invention.

Figure 1:
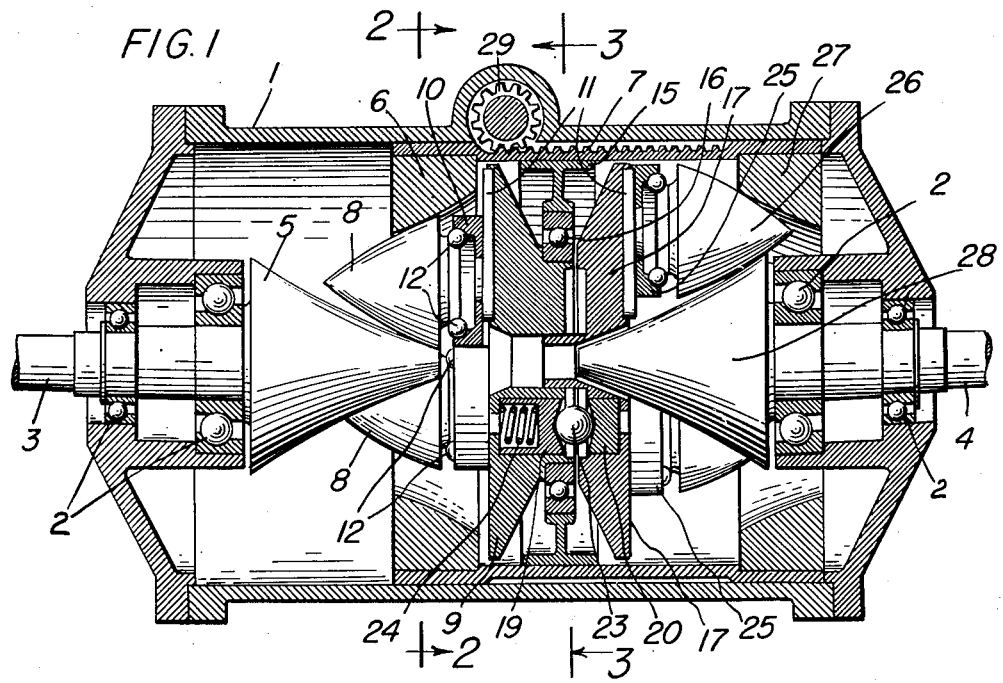
Fig. 1 is a view partly in side elevation, partly in vertical section, showing the interior of the preferred embodiment of my invention.
Figure 2:
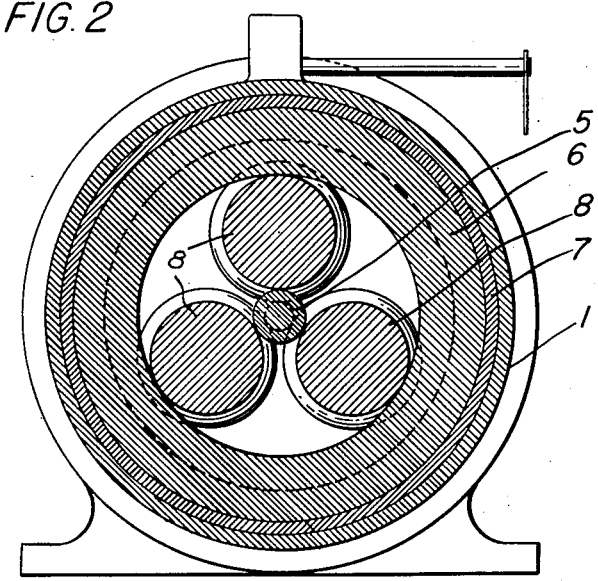
Fig. 2 is a vertical sectional view taken on the line 2—2 of Fig. 1 showing the relationship of the rollers in the preferred embodiment of my invention.

As shown in Fig. 1, the preferred embodiment of my invention comprises a cylindrical housing 1 having bearings 2 at each end supporting shafts 3 and 4. The shaft 3 terminates in an inner cone 5, which is rigidly attached at its base to the shaft 3 as by welding, so that it rotates when the shaft 3 is rotated. Surrounding the inner cone 5 is an outer hollow cone or ring 6 which is fixed to a bushing 7 axially movable within the housing 1. The interior of the outer cone 6 is shaped to converge toward the base of the inner cone 5. Between the cone 5 and the cone 6 are located a plurality, here shown as three, of rollers 8. As may be seen from Fig. 4, these rollers 8 are conical in shape and are carried in planetary fashion about the inner cone 6 on the disc-like planetary holder 9 by means of bearing cups 10 and pins 11. The rollers are rotatably mounted in the cups on balls 12; the cups in turn being attached to the planetary holder by means of the pins 11. These pins are adapted to fit into guides 13, and slots 14 in the faces of the cup and planetary holder, respectively. It will be noted that the guides 13 in the cup are open at their ends so that the cups and with them the rollers are slidable radially with respect to the planetary holder. The pins 11, however, insure that when the conical rollers are moved about the axis of the inner cone 5, they will carry the planetary holder 9 with them.

The planetary holder 9 is itself rotatably held within the bushing 7 by a guide ring 15 and ball bearing 16.

On the side of the planetary holder 9 opposite to that on which are located the cups 10 is positioned a second planetary holder 17. Frictionally joining the two planetary holders 9, 17 are a plurality of pressure changers 18 (Fig. 5).

The pressure changers 18 each consist of two friction discs 19, 20 adapted to fit into recesses 21, 22 in the two planetary holders 9 and 17, respectively. A ball 23 is interposed between the two discs and a spring 24, in the recess of planetary holder 9, urges disc 19 outward and presses the ball 23 against the disc 20.

As may be seen from Fig. 3, three of these pressure changers are provided. Together they form a firm frictional connection between the two planetary holders, so that when one is rotated it will turn the other.

On the side of the planetary holder 17 opposite to that facing planetary holder 9 are arranged a system of bearing cups 25 and rollers 26 similar to that described above. An outer cone 27 and an inner cone 28 are also provided, the relationship of all these being identical with their counterparts on the other side of the drive mechanism.

Means comprising a cog wheel 29 are provided for moving the bushing and with it the whole system of outer cones, rollers and planetary holders from one end of the housing to the other.

The operation of the novel drive means is as follows:

Power is applied to the shaft 3 and the inner cone 5 is thereby rotated. Rotation of the inner cone 5 by adhesional friction causes rollers 8 to rotate about their axes and to revolve about the axis of the inner cone 5. The rollers 8 bear on the interior surface of the outer cone 6 as well as on the exterior of the inner cone 5. As these rollers revolve about the axis of the conical member 5 they carry with them the planetary holder 9 by means of the pins 11 and cause it to rotate about its own axis.

It should be noted that because of the arrangement of conical surfaces, very little load is borne by the bearings 2 and 12. The main stresses are taken up by outer cones 6 and 27 where they neutralize each other.

The torsional moment transmitted by the rollers to the planetary holder 9 is transmitted by it through the pressure changer 18 to the planetary holder 17. The pressure changer exerts an axial pressure proportional to the moment of torsion, which tends to force the planetary holders apart axially. At the same time the pressure changer 18 causes the planetary holder 17 to rotate along with the planetary holder 9. The rollers 26 are carried around by the planetary holder 17 and cause the inner cone 28 and the shaft 4 to rotate.

The use of the pressure changers 18 as well as transmitting the torsional moment to the planetary holder 17, serves to keep the axial load on the rollers 8, 26, the inner cones 5, 28 and the outer cones 6, 27 approximately proportional to the moment of torsion. This results in a high efficiency over a broad power range. It should also be noted that the number of revolutions made by the rollers 8, 26 is relatively small, even at high shaft speeds. Therefore the centrifugal force is so slight that its effect may be ignored.

As shown in the drawings, the driving means will transmit a reduced number of revolutions. If it is desired to have the driving means transmit a higher speed to the shaft 4 than is put into the shaft 3, the cog wheel 29 is rotated and the bushing 7 is thereby moved toward the shaft 3. As this is done the rollers 8 will take up a position further removed from the axis of the inner cone 5 and closer to its base. At the same time they will move further away from the converging end of the outer cone 6. Similarly the rollers 26 will move further toward the apex of the inner cone 28, and toward the converging end of the outer cone 27.

It is to be noted that the radius of curvature of the inner cones will be equal to the radius of the curvature of the outer cones plus twice the radius of curvature of the rollers. Under such conditions the angle made by a tangent to the outer cone and the axis of the outer cone is equal to the angle made by a tangent to the surface of the inner cone and the axis of the inner cone, each of these tangents being taken at the point of contact of a roller with the cone in question and being coplanar with the axis of that cone. Under such conditions it is also true that the axial distance between the planetary holders remains constant.

The present invention offers a drive mechanism of exceedingly long life because of the fact that there are no sharp points of contact between the rolling members and because on adjustment continuously new rolling surfaces are brought into action. The device provides for a wide range of speed adjustments. Moreover, with the present invention, minimum pressure forces and bearing pressures are used because the diameters of contacting conical parts increase with the torsional moments applied. At the same time the design is of simple construction, easy to manufacture and repair.

As shown in the drawings, the inner cones, outer cones and conical planetary rollers are preferably all made with curved cone elements, the curves in this case being circular arcs.

While I have found such a construction preferable in that it insures a long life for all the rolling parts and permits a broad range of adjustment, it is possible to employ cones otherwise curved or with straight sides. Under some conditions simple balls kept in separate bearings can be used as rollers. For special cases one-sided drives for increasing or reducing the number of revolutions may be constructed. The drive need not be constructed in a symmetrical manner.

For certain operations the outer cones can be rotatably arranged and revolved at a fixed speed.

While the present invention is particularly useful in powering machine tools, many other applications are possible, as for example in driving vehicles.

What I claim is:

1. In a variable speed drive, an inner cone rotatable about its axis, an outer hollow cone surrounding the inner cone, a planetary holder coaxial with said inner cone and mounted for rotation about the axis of said inner cone, a plurality of radially displaceable roller bodies carried by said planetary holder and arranged between, and contacting, said inner cone and said outer cone, and torque-responsive means for pressing said roller bodies axially against the outer cone and the inner cone, said outer cone and said inner cone being tapered in opposite directions and the points of contact of said roller bodies with said inner cone and said outer cone lying in one plane which is always perpendicular to the axis of the inner cone.

2. Apparatus as claimed in claim 1 wherein the elements of the surfaces of the inner and outer cones are arcuate.

3. Apparatus as claimed in claim 1 wherein the elements of the surface of the inner and outer cones are arcuate and wherein the angle made by a tangent to the outer cone and the axis of the outer cone is equal to the angle made by a tangent to the surface of said inner cone, and the axis of said inner cone, each of said tangents being taken at the point of contact of said roller with the cone in question and being coplanar with the axis of that cone.

4. Apparatus as claimed in claim 1 wherein the elements of the surface of the inner and outer cones are arcuate and wherein the angle made by a tangent to said outer cone and its axis is smaller at the converging end of said outer cone than at the diverging end and wherein an angle formed by a tangent to the surface of said inner cone and the axis of said inner cone is smaller at the narrow end of that member than at the wide end, said tangents being coplanar with the axes of their respective cones.

5. Apparatus as claimed in claim 1 wherein the elements of the surface of the inner and outer cones are arcs of a circle.

6. Apparatus as claimed in claim 1 wherein the elements of said inner cone and said outer cone are arcuate and wherein th radius of curvature of the inner cone is equal to the radius of curvature of the outer cone plus twice the radius of curvature of a roller.

7. Apparatus as claimed in claim 1 wherein the rollers are conical in form.

8. Variable speed driven means comprising a tapered inner driving cone rotatable about its axis, a first outer cone surrounding said inner driving cone and tapered oppositely to said inner driving cone, a group of driving rollers between and tangent to said inner driving cone and said first outer cone, a tapered inner driven cone rotatable about its axis and mounted coaxially with said inner driving cone, a second outer cone surrounding said inner driven cone and tapered oppositely to said inner driven cone, a group of driven rollers between and tangent to said second outer cone and said inner driven cone and movable independently of said group of driving rollers and means responsive to the moment of torsion connecting said driving rollers with said driven rollers, the points of contact of said driving rollers with said inner driving cone and said first outer cone and the points of contact of said driven rollers with said inner driven cone and said second outer cone lying in two planes which are always perpendicular to the axis of said inner driving cone and said inner driven cone respectively.

9. Drive means as claimed in claim 8 wherein said outer cones are non-rotatable.

10. Drive means as claimed in claim 8 wherein said rollers are conical.

11. Drive means as claimed in claim 8 wherein said connecting means comprise two planetary holders.

12. Drive means as claimed in claim 8 wherein said rollers are rotatable about their axes and carried by said planetary holders.

13. Drive means as claimed in claim 8 wherein said inner driving cone and said outer driving cone are tapered inwardly in opposite directions and wherein said means responsive to the moment of torsion connecting said rollers comprises two discs connected with one another by means axially responsive to the moment of torsion whereby said discs are forced away from one another by an increasing torsional moment and the driven and driving rollers are pressed against the surfaces of their inner and outer cones thereby insuring higher contact pressures for higher output moments of torsion.

14. Drive means as claimed in claim 13 and including pressure means independent of the moment of torsion forcing said discs apart whereby a firm power transmitting closure is effected even when the drive means is running idle.

15. Drive means as claimed in claim 8 wherein said connecting means comprises two discs, matching recesses in each of said discs, said recesses being located at points removed from the center of said discs and spring means fitted into said recesses and adapted to act on balls interposed between said discs and thereby urge said discs apart.

15. Drive mechanism as claimed in claim 8 wherein said outer cones and said rollers are axially movable with respect to said inner cones, whereby said drive mechanism is rendered adjustable without stages.

17. Drive means as claimed in claim 16 wherein the axial distance between said outer cones and said inner cones is constant for each drive position.

HENRY SCHOTTLER.

REFERENCES CITED

The following references are of record in the file of this patent:

UNITED STATES PATENTS

| Number | Name | Date |
|---|---|---|
| 1,298,560 | Poppink | Mar. 25, 1919 |
| 1,528,530 | Coffee | Mar. 3, 1925 |
| 1,585,140 | Erban | May 18, 1926 |
| 1,683,715 | Erban | Sept. 11, 1928 |
| 1,770,408 | Jacobsen | July 15, 1930 |
| 1,850,189 | Weiss | Mar. 22, 1932 |
| 1,995,689 | Shively | Mar. 26, 1935 |
| 2,209,497 | Winger et al. | July 30, 1940 |

Certificate of Correction

Patent No. 2,559,230                                                            July 8, 1951

HENRY SCHOTTLER

It is hereby certified that error appears in the printed specification of the above numbered patent requiring correction as follows:

Column 4, line 75, for "driven" read *drive*; column 6, line 18, for the claim numbered "15" read *16*;

and that the said Letters Patent should be read as corrected above, so that the same may conform to the record of the case in the Patent Office.

Signed and sealed this 25th day of September, A. D. 1951.

[SEAL]

THOMAS F. MURPHY,
*Assistant Commissioner of Patents.*